3,507,683
METHOD FOR APPLYING HEAT-SEALABLE POLYAMIC ACID, POLYAMIDE-IMIDE AND AROMATIC POLYAMIDE COMPOSITIONS TO A SYNTHETIC POLYMER FIBRID PAPER SUBSTRATE
Joseph F. Parsons, Folcroft, Pa., assignor to E. I. du Pont de Nemours and Company, Wilmington, Del., a corporation of Delaware
No Drawing. Filed June 22, 1967, Ser. No. 647,904
Int. Cl. B44d *1/44;* B32b *27/08*
U.S. Cl. 117—63                                                5 Claims

ABSTRACT OF THE DISCLOSURE

A process for coating a substrate material, preferably synthetic polymer fibrid paper, with a coating composition of a polyamic acid, polyamide-imide, or an aromatic polyamide which thereby renders the coated substrate material heat-sealable. The process comprises:

(1) applying a solution of the polymer onto the substrate; and
(2) contacting the wet polymer coating of Step 1 with water whereby the polymer is precipitated upon the substrate and the solvent is extracted.

BACKGROUND OF THE INVENTION

This invention relates to a process for rendering a material heat-sealable by (1) coating the material with a polyamic acid, polyamide-imide, or aromatic polyamide, and (2) precipitating the polymer and simultaneously extracting the solvent with water. Thereafter, the excess water is removed from the coated material.

It is often desirable to coat a material thereby rendering it heat-sealable, especially when the material has to be shaped before it can be used. For purposes of this invention, the term heat-sealable refers to that property of a material which causes the coated material when pressed against itself under conditions of elevated temperature and pressure, to form an extremely strong bond between the adjacent layers which remains after the material is removed from the elevated temperature and pressure conditions. Although prior methods have been used to obtain heat-sealability with the polymer coatings of this invention, these methods have not been entirely satisfactory because they almost invariably involve drying the coated material at an elevated temperature in order to volatilize the solvent for the polymer. The combination of elevated temperature and a substantial amount of solvent present results in solvation of the substrate material. This problem is especially encountered when attempts are made to coat synthetic polymer fibrid paper such as is disclosed in Morgan, U.S. Patent 2,999,788, issued Sept. 12, 1961. Solvation of the paper substrate causes the coated product to have a number of undesirable characteristics including significantly lower elongation after curing and a boardy feel and appearance. Significantly lower elongation after curing is evidence that the paper product is brittle and is likely to crumble away during shaping which makes it extremely difficut to work with.

SUMMARY OF THE INVENTION

According to this invention there is provided a process for producing heat-sealable materials. This process comprises the steps of:

(1) applying a solution of a polymer selected from a polyamic acid, a polyamide-imide, and an aromatic polyamide onto the substrate material; and
(2) contacting the wet polymer coating of step 1 with water whereby the polymer is precipitated upon the substrate and the solvent is extracted.

By this invention heat-sealable coated materials can be prepared which are not subjected to solvation of the substrate material. This avoids the problem of the prior art methods, especially when the substrate to be coated is a synthetic polymer fibrid paper. Substrates other than those already mentioned above which can be coated successfully by the process of this invention include wood-pulp paper, cloth fabrics, glass sheets, glass fabrics, wood, plastics, mica, fiberglass and metals such as copper, aluminum, steel, nickel, silver, chromium, etc.

DESCRIPTION

The polymers which are useful for this invention include polyamic acids, polyamide-imides, and aromatic polyamides. Each of these classes of polymers displays good solubility in practical liquid organic solvents which make them useful in coating compositions. In addition, it is possible to precipitate these polymers from solution by adding water to the solution. Such precipitation generally results in the application of a uniform opaque coating upon the substrate material.

Polyamic acids useful for this invention have the structural formula,

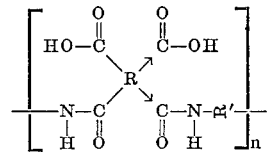

wherein the arrows denote isomerism; R is an organic tetravalent radical containing at least two carbon atoms, no more than two carbonyl groups of each polyamic acid unit being attached to any one carbon atom of said tetravalent radical; R′ is a divalent radical containing at least two carbon atoms, the amide groups of adjacent polyamic acid units each attached to separate carbon atoms of the divalent radical; and $n$ is an integer sufficient to provide a polyamic acid having an inherent viscosity of at least 0.1, and preferably 0.3 to 5.0 measured in a 0.5% solution of N,N-dimethylacetamide at a temperature of 30° C.

For a further description of polyamic acids useful for forming heat-sealable coatings by the process of this invention, see the following U.S. patents, all of which are herein incorporated by reference to illustrate suitable polyamic acids: U.S. 3,179,614, issued Apr. 20, 1965; and U.S. 3,190,856, issued June 22, 1965; U.S. 3,179,635, issued Apr. 20, 1965. Polyamic acids are sometimes referred to as polyamide-acids, and the words are used synonymously and interchangeably for this invention.

Polyamide-imides useful in the practice of this invention have the structural formula,

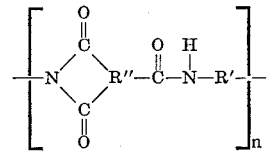

wherein R′ and $n$ are the same as above and R″ is a trivalent aromatic radical. For a more detailed description of suitable polyamide-imides, see the following patents and applications, all of which are herein incorporated by reference to illustrate such polyamide-imides: U.S. 3,260,691, issued July 12, 1966; U.S. Ser. No. 608,735, filed Jan. 2, 1967; Belgian Patent 650,979; and Netherlands Patent 6,400,422, published Feb. 22, 1964. Polyamide amic acids, such as those disclosed in U.S. Ser. No. 472,314, filed July 15, 1965, are considered equivalents of polyamide-imides for purposes of this invention because they can be converted to the imide form by heating them to an elevated temperature.

Aromatic polyamides having the structural formula,

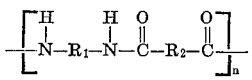

wherein $R_1$ and $R_2$ are divalent aromatic radicals and $n$ is the same as above, are also useful for this invention. For further examples of suitable aromatic polyamides, see U.S. application Ser. No. 543,078, filed Apr. 18, 1966; and U.S. Patent 3,094,511, issued June 18, 1963.

In the preparation of the coating compositions of the present invention, it is essential that the molecular weight be such that the inherent viscosity of the polymer be at least 0.1 and is preferably 0.3 to 5.0. The inherent viscosity is measured at 30° C. at a concentration of 0.5% for purposes of the present invention in N,N-dimethylacetamide. However, it should be understood that any other solvent could have been chosen to provide duplicatable results.

The viscosity of the polymer solution is measured relative to that of the solvent alone, and the following formula is used to calculate the inherent viscosity:

Inherent viscosity $$= \frac{\text{Natural logarithm } \frac{\text{Viscosity of solution}}{\text{Viscosity of solvent}}}{C}$$

where C is the concentration expressed in grams of polymer per 100 milliliters of solution. As is known in the polymer art, inherent viscosity is directly related to the molecular weight of the polymer.

The solvents useful in the coating compositions of this invention can also be used in solution polymerization processes for synthesizing the polymer compositions of the present invention. These are the organic solvents whose functional groups do not react with any of the starting reactants for these polymers to a greater extent than the reactants do with each other. Besides being inert to the system, and being a solvent for the product, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process of this invention. The preferred solvents are the lower molecular weight members of this class, particularly N-methyl-2-pyrrolidone, N,N-dimethylformamide and N,N-dimethylacetamide. They can be easily removed from the polymer coatings by water extraction. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, tetramethylene urea, pyridine dimethylsulfone, hexamethylphosphoramide, tetramethylene sulfone, formamide, N-methylformamide and N-acetyl-2-pyrrolidone. These solvents can be used alone, in combinations of solvents or in combination with poorer solvents such as benzene, benzonitrile, dioxane, butyrolacetone, xylene, toluene and cyclohexane.

Application of the polymer solutions to the substrate material can be accomplished by any practical method which brings the two into contact. Some examples of suitable techniques include: dipcoating, roller coating, spray coating, knife coating, curtain coating, electro-static spray coating, etc. Roller coating and knife coating are the preferred methods of application.

The thickness of the coatings applied will vary, of course, with the intended use of the coated product. In general, excellent heat-sealability can be obtained without sacrificing other desirable qualities with coatings applied uniformly in an amount of 0.5 ounce of solution per square yard of substrate.

The wet solution coating is contacted with water to extract the solvent and to precipitate the polymer composition on the substrate. Any method of contacting the wet coating with water is suitable as long as it results in substantially all of the solvent being extracted and substantially all of the dissolved polymer being precipitated uniformly onto the substrate. Examples of suitable methods include dipping the coated substrate into a water bath, running the coated substrate through a water bath and gently spraying the wet coating with water.

After the polymer is precipitated and the solvent extracted the excess water on the polymer coating can be removed by standard techniques. Evaporation and extraction with acetone or another low boiling ketone are suitable examples of procedures for removing the water. An easy method for drying the coated substrate is to evaporate the water by blowing air which has been heated slightly above room temperature across its surface.

Coated substrate material prepared by the process of this invention can be heat-sealed by first shaping it as desired and subsequently subjecting the coated substrate to a combination of elevated temperature and elevated pressure. The exact conditions required for heat-sealing varies with the polymer composition used, but the coated substrates can generally be heat-sealed in 30 seconds at 200° C. and 200 pounds per square inch pressure.

The preferred embodiment of this invention comprises the application of a polyamic acid solution prepared from approximately equimolar proportions of benzophenone tetracarboxylic acid dianhydride and methylene dianiline in a solvent of N-methyl-2-pyrrolidone onto a synthetic polymer fibrid paper. The preferred process steps are:

(1) roller coating the solution of polyamic acid onto the synthetic paper; and
(2) dipping the coated paper into a water bath.

The excess water is removed by air drying.

Synthetic paper coated in this manner is readily heat-sealable, has excellent surface aesthetics, and does not embrittle after heat curing.

The process of this invention is useful for producing coated substrate materials which are heat-sealable. It is especially useful for rendering synthetic polymer fibrid paper heat-sealable. Synthetic polymer fibrid paper can be produced which has excellent heat resistance and thermal stability at temperatures in excess of 150° C. by using as a substrate a wholly aromatic polyamide synthetic paper coated with one of the polymers of this invention. Coated papers which are heat-sealable and have these high temperature characteristics are useful as a sheet material or tape for: (1) turn, layer and tube or barrier insulation in high temperature, dry tape transformers where self-bonding sheet insulation is desirable; (2) slot phase and wedge insulation in motors and generators; (3) tapes and coil wrappers which heat-seal, thus eliminating a varnish application; (4) bobbins and tubes which require bonding during fabrication; and (5) numerous other specialty insulation application in electrical equipment.

The following examples illustrate the invention. All parts and percentages are by weight unless otherwise specified.

EXAMPLE I

A

Two mil synthetic polymer fibrid paper is roller coated with a solution of a polyamic acid prepared from reacting approximately equimolar quantities of benzophenone tetracarboxylic acid dianhydride and methylene dianiline in a solvent of N-methyl-2-pyrrolidone. The coated paper is heated in an oven at 150° C. for 30 minutes to evaporate the solvent.

B

Two mil synthetic polymer fibrid paper is roller coated with the same solution as used in Example I-A. The coated paper is dipped into water at room temperature for 30 seconds and immediately thereafter into acetone for 10 seconds, after which it is allowed to air dry. A soft, off-white opaque film is formed on the paper which allows the paper to be heat-sealed successfully in 30 seconds when pressed between two jaws heated to 200° C. which apply 200 pounds per square inch pressure to the material.

Elongation tests are made on samples of the coated paper prepared by the procedures of Examples I-A and I-B both before and after these samples have been heat-aged at 260° C. for 240 hours. Elongations are determined by a procedure which closely follows ASTM Test No. 638-64T using an Instron-Tensile Tester, the results being as follows:

Procedure A: Percent
  Original elongation _____ 10
  Elongation after heat-aging _____ 2-5
Procedure B:
  Original elongation _____ 10
  Elongation after heat-aging _____ 10

As can be seen from these results, the paper coated by procedure I-A has an embrittlement problem due to solvation of the substrate which is completely eliminated by the procedure of I-B.

EXAMPLE II

The procedure of Example I-B is followed except that the polyamic acid solution is prepared by reacting approximately equimolar quantities of benzophenone tetracarboxylic acid dianhydride and meta-phenylene diamine in a solvent of dimethyl formamide.

EXAMPLE III

The procedure of Example I-B is followed except that the polyamic acid solution is prepared by reacting approximately equimolar quantities of benzophenone tetracarboxylic dianhydride and oxydianiline in a solvent of N-methyl-2-pyrrolidone.

EXAMPLE IV

The procedure of Example I-B is followed except that the polyamic acid solution is prepared by reacting approximately equimolar quantities of 3,4-dicarboxylphenyl sulfone dianhydride and methylene dianiline in a solvent of N,N-dimethyl acetamide.

EXAMPLE V

The procedure of Example I-B is followed except that a polyamide-imide is substituted for the polyamic acid. The polyamide-imide is prepared by reacting approximately equimolar quantities of the acid chloride of trimellitic anhydride and methylene dianiline in a solvent of N-methyl-2-pyrrolidone.

EXAMPLE VI

The procedure of Example I-B is followed except that an aromatic polyamide is substituted for the polyamic acid. The aromatic polyamide is a reaction product of approximately equimolar quantities of the diacid chloride of isophthalalic acid and methylene dianiline reacted in a solvent of N-methyl-2-pyrrolidone.

EXAMPLE VII

The procedure of Example I-B is followed except that the polyamic acid solution is coated onto a copper panel instead of the synthetic polymer fibrid paper. The wet coating is applied by using a 2.4 Bird Film Applicator. The coated copper panel is dipped in water and dried at ambient water temperatures. A soft white film having excellent surface aesthetics is formed on the copper panel.

What is claimed is:

1. A process for coating synthetic polymer fibrid paper substrate material thereby rendering the substrate material heat-sealable which comprises:
   (1) applying a solution of a polymer having an inherent viscosity of at least 0.1 and being selected from the group consisting of a polyamic acid, a polyamide-imide, and an aromatic polyamide onto the substrate material; and
   (2) contacting the wet polymer coating of step (1) with water whereby the polymer is precipitated upon the substrate and the solvent is extracted.

2. The process of claim 1 wherein the polymer solution is a polyamic acid comprising the reaction product of benzophenone tetracarboxylic acid dianhydride and methylene dianiline dissolved in N-methyl-2-pyrrolidone.

3. The process of claim 2 wherein the wet polymer coating is contacted with water by running the coated paper through a water bath.

4. The process of claim 1 wherein the polymer solution is a polyamide-imide comprising the reaction product of the acid chloride of trimellitic anhydride and methylene dianiline dissolved in a solvent of N-methyl-2-pyrrolidone.

5. The process of claim 1 wherein the polymer solution is an aromatic polyamide comprising the reaction product of the diacid chloride of isophthalic acid and methylene dianiline dissolved in a solvent of N-methyl-2-pyrrolidone.

References Cited

UNITED STATES PATENTS

| | | |
|---|---|---|
| 2,999,788 | 9/1961 | Morgan. |
| 3,100,721 | 8/1963 | Holden _____ 117—63 |
| 3,179,614 | 4/1965 | Edwards. |
| 3,179,633 | 4/1965 | Endrey. |
| 3,190,856 | 6/1965 | Lavin. |
| 3,238,055 | 3/1966 | Brightwell _____ 117—63 |

WILLIAM D. MARTIN, Primary Examiner

J. E. MILLER, JR., Assistant Examiner

U.S. Cl. X.R.

117—122, 132, 138.8, 161